United States Patent [19]

Koza et al.

[11] Patent Number: 4,652,998

[45] Date of Patent: Mar. 24, 1987

[54] VIDEO GAMING SYSTEM WITH POOL PRIZE STRUCTURES

[75] Inventors: John R. Koza, Atlanta; Norman T. La Marre, Norcross, both of Ga.; Martin A. Keane, Arlington Heights, Ill.

[73] Assignee: Bally Manufacturing Corporation, Chicago, Ill.

[21] Appl. No.: 568,080

[22] Filed: Jan. 4, 1984

[51] Int. Cl.[4] .................... G06F 15/28; A63B 71/00; A63F 3/08

[52] U.S. Cl. .................... 364/412; 364/900; 273/138 A; 273/274

[58] Field of Search .............. 364/410, 411, 412, 200, 364/900, 717; 273/85 G, 269, 138 A, DIG. 28, 237, 121 A, 274

[56] References Cited

U.S. PATENT DOCUMENTS

| | | | |
|---|---|---|---|
| 3,002,512 | 10/1961 | Krause | 273/138 A |
| 4,157,829 | 6/1979 | Goldman et al. | 273/138 A |
| 4,332,389 | 6/1982 | Loyd, Jr. et al. | 273/138 A |
| 4,335,809 | 6/1982 | Wain | 273/138 A |
| 4,367,876 | 1/1983 | Kotoyori | 273/121 A |
| 4,451,896 | 5/1984 | Pomeleau et al. | 364/411 X |
| 4,467,424 | 8/1984 | Hedges et al. | 273/138 A |
| 4,494,197 | 1/1985 | Troy et al. | 364/412 |
| 4,527,798 | 7/1985 | Siekerski et al. | 273/138 A |
| 4,547,851 | 10/1985 | Kurland | 364/900 X |

FOREIGN PATENT DOCUMENTS

| | | | |
|---|---|---|---|
| 2148135 | 5/1985 | United Kingdom | 273/138 A |

OTHER PUBLICATIONS

*Public Gaming Magazine*, "Where is the Industry Heading", Oct. 1981, pp. 14-22.

*Primary Examiner*—Jerry Smith
*Assistant Examiner*—Jon D. Grossman
*Attorney, Agent, or Firm*—Jenner & Block

[57] ABSTRACT

A video amusement gaming system with pool prize structures including remote game terminals and a central controller with two-way communications between the remote game terminals and the central controller. Prize awards are based upon random shuffling of a set of prize awards among a predetermined pool of plays for each remote game terminal. This ensures an equal distribution of prize awards to each remote game terminal. The shuffling of prizes is based upon a random seed produced either by the remote terminal of the central controller or by both.

6 Claims, 8 Drawing Figures

VIDEO GAMING SYSTEM WITH POOL PRIZE STRUCTURES

This invention relates generally to secure electronic gaming systems and more particularly to a video amusement gaming system having remote gaming terminals and a central controller, utilizing pool prize structure.

Prior art lottery gaming systems have typically involved a drawings or instant "rub-off" games. The current lotteries involving drawing, incorporate computerized systems using electronic terminals operated by licensed retail lottery vendors to dispense printed tickets having the players own selection of lottery numbers printed thereon. These systems are limited in that they require a clerk to operate the lottery terminal. Further, lotteries have been criticized for their appeal to lower income consumers. However, in recent times, there has been explosive growth in the coin-operated video amusement game market which involves an entirely new group of consumers in a market different from any existing lottery. A synthesis of these two fields presents an opportunity to permit consumer operated terminals offering the opportunity to win a prize and to appeal to a new market. However, such a lottery system would preferably utilize a microprocessor based game system which can be customized for different types of games, and which can communicate with a central computer. To improve fairness in such a system a pool prize structure can be used to ensure that lottery prize awards are adequately distributed among the game terminals.

It is accordingly an object of this invention to provide a video amusement gaming system having a unique pool prize structure.

Briefly, according to one embodiment of the invention, a player operated video amusement game machine for use in a gaming system is providing including means for providing an opportunity to win a prize by actuating the game machine. The game machine also includes means for distributing the positions of a selected set of prize awards within a first pool of game plays by randomly shuffling the selected prize awards among the first pool of plays according to a shuffle algorithm responsive to a random seed, and player control devices for providing player control signals. A video game means provides a video amusement game display presentation according to a set of game operational conditions responsive to the player control signals and gaming means provides a prize indication disclosing a prize award characteristic of whether the position of the game play within the first pool corresponds to the position of a selected prize award.

BRIEF DESCRIPTION OF THE DRAWINGS

The features of the present invention which are believed to be novel are set forth below with particularity in the appended claims. The invention, together with further objects and advantages thereof, may be understood by reference to the following description and taken in conjunction with the accompanying drawings.

DETAILED DESCRIPTION OF THE PREFERRED EMBODIMENT

Figure 1:
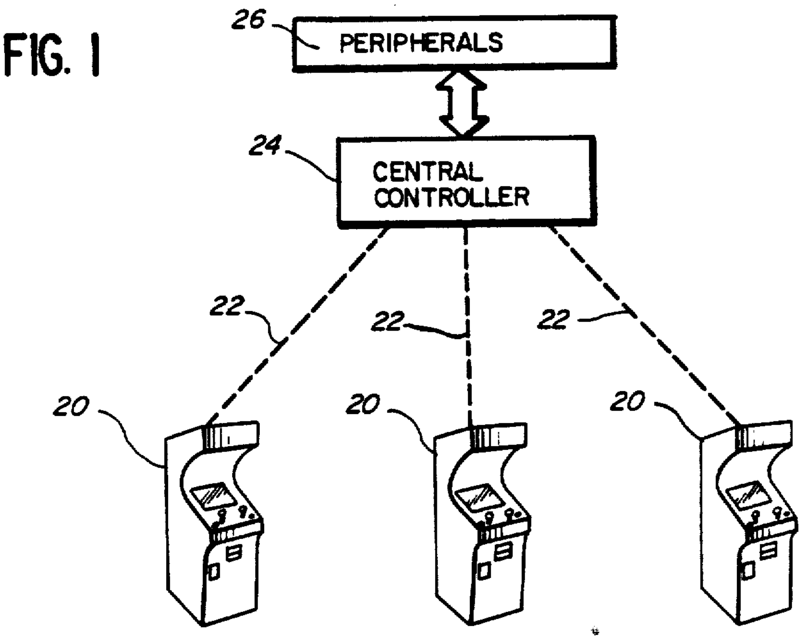
FIG. 1 is a generalized functional block diagram of a specific embodiment of a secure lottery video game with secure remote communications.

FIG. 1 illustrates in functional block diagram form a specific embodiment of a secure video amusement gaming system with remote secure communications. The system is a lottery system which includes a number of player operated remote secure video amusement game lottery terminals 20 (hereinafter referred to as remote terminals). In a preferred embodiment, thousands of such remote terminals 20 may be installed at remote sites such as bars, clubs, retail outlets, etc. It should be noted that this system of terminals may also be used in applications not involving a payed lottery, for example, in retail outlets where play and an opportunity to win a prize is provided to patrons as a promotion (e.g. using a token).

Each remote terminal 20 has the general appearance and functions of a video amusement game including, for example, video display screen, color graphics, sound, laser disc technology, digital video technology, and other video technology. A player activates the remote terminal 20 by placing his money or other form of payment in the terminal and then plays a video amusement game. The player is provided with the amusement and entertainment of a video game while at the same time playing the lottery thus having the opportunity to win a lottery prize. This permits a lottery system with consumer operated terminals and avoids the need for a trained terminal operation clerk. Thus, the remote terminals 20 are not bet collection devices but rather player operated lottery game machines offering the player an opportunity to instantly win while interacting with the game machine. Each remote terminal 20, in the preferred embodiment, permits the player to have a choice of one of a plurality of different video games. The choice of games may include games using only computer generated video, games using only prerecorded video, such as on a video disk, or a game utilizing a combination of both.

Each remote terminal 20 is coupled, as shown, by a communications medium 22 to a central controller 24, which is primarily comprised of a computer. In the preferred embodiment, the communications medium 22 is a telephone link whereby central controller 24 can maintain two-way communications with the remote terminals. Clearly, other communications media will be obvious to those skilled in the art, for example, a two-way dedicated cable, a radio frequency channel, etc. The two-way communications between the remote terminals is conducted using encrypted information so as to prevent unauthorized access to the communicated data.

The central controller 24 maintains supervision over the entire network of remote terminals 20 handling, for example, accounting, validation, security, and seeding of pools, among other tasks. The central controller 24 is coupled, as shown, to a number of peripheral devices 26 such as magnetic disks for storage of data, terminals for operator supervision, and line printers, etc.

Figure 2:
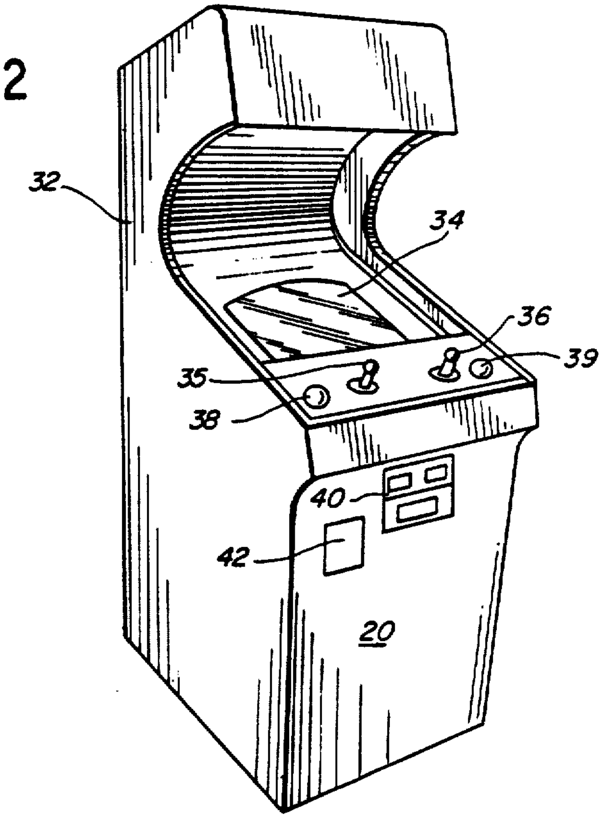
FIG. 2 is a perspective view of a specific embodiment of a secure lottery video game remote terminal.

Referring now to FIG. 2, a perspective view of a specific embodiment of the remote terminal 20 embodying various aspects of the present invention is shown. Remote terminal 20 is comprised of the cabinet housing 32, having an appearance similar to an arcade video game which contains all necessary electronics. A display screen 34, which may be tilted at an angle as shown, is provided for convenient player viewing. In the illustrated embodiment, display 34 is a raster scan display which permits display of video images, instructions, game rules, odds of winning, and other information. The housing 32 also contains two speakers at the level of the player's ear (not shown) so as to be easily heard and to provide for stereo sound. Player control means are provided as a source of player provided stimuli for transfer to the system electronics. The player control means are mounted below the video display screen 34 and include two joysticks with triggers 35, 36 and two pushbuttons 38, 39, such as are commonly used in the video game art. In the illustrated embodiment, the joysticks 35, 36 provide signals responsive to user movement of the joysticks in a 360° radius about the center pivot point of the joystick to control interaction of the player with the game play and logic. Typically, the joysticks control movement of some "control spot" on the screen such as a dot, cursor, star, arrow, or game character to a desired horizontal and vertical position. The two joysticks allow for dual play while the trigger allows for easy control during fast game play action. The two pushbuttons 38, 39 provide for selection of options such as one or two player game operation and other control functions. Clearly, other player control configurations known in the art may be utilized, such as, touch screens, light pens, mice, audio speech recognition units, keyboards, etc.

Each remote terminal 20 is also provided with a conventional electromechanical or electronic coin mechanism 40 on the front of the housing 32 to accept user coins or tokens to actuate the terminal 20. An optional bill accepter or second coin mechanism may be provided for the convenience of the player and minimize machine down time by providing a second means for payment. Other payment mechanisms may also be used, for example, tokens, debit cards, credit cards, etc. An escrow function is provided such that a player may decide not to play after inserting the money and may then receive cash or a credit receipt in return. Additionally, fewer or greater number of joysticks and pushbuttons, or other player control devices, can be provided according to the requirements of the video games desired.

A printer mechanism is provided at the front of the housing 32 mounted inside the housing. A recessed box 42, mounted behind the front panel of the housing 32 and opening to the front, keeps the printer beyond the player's reach and is used as a receptacle for tickets dispensed from the printer. The printer permits the issuance of lottery tickets as a receipt indicating a lottery win or loss, and permits printing of agent invoices, etc. The terminal housing 32 also includes an access door (not shown) to permit access by authorized personnel to the interior of the housing 32.

Figure 3A:
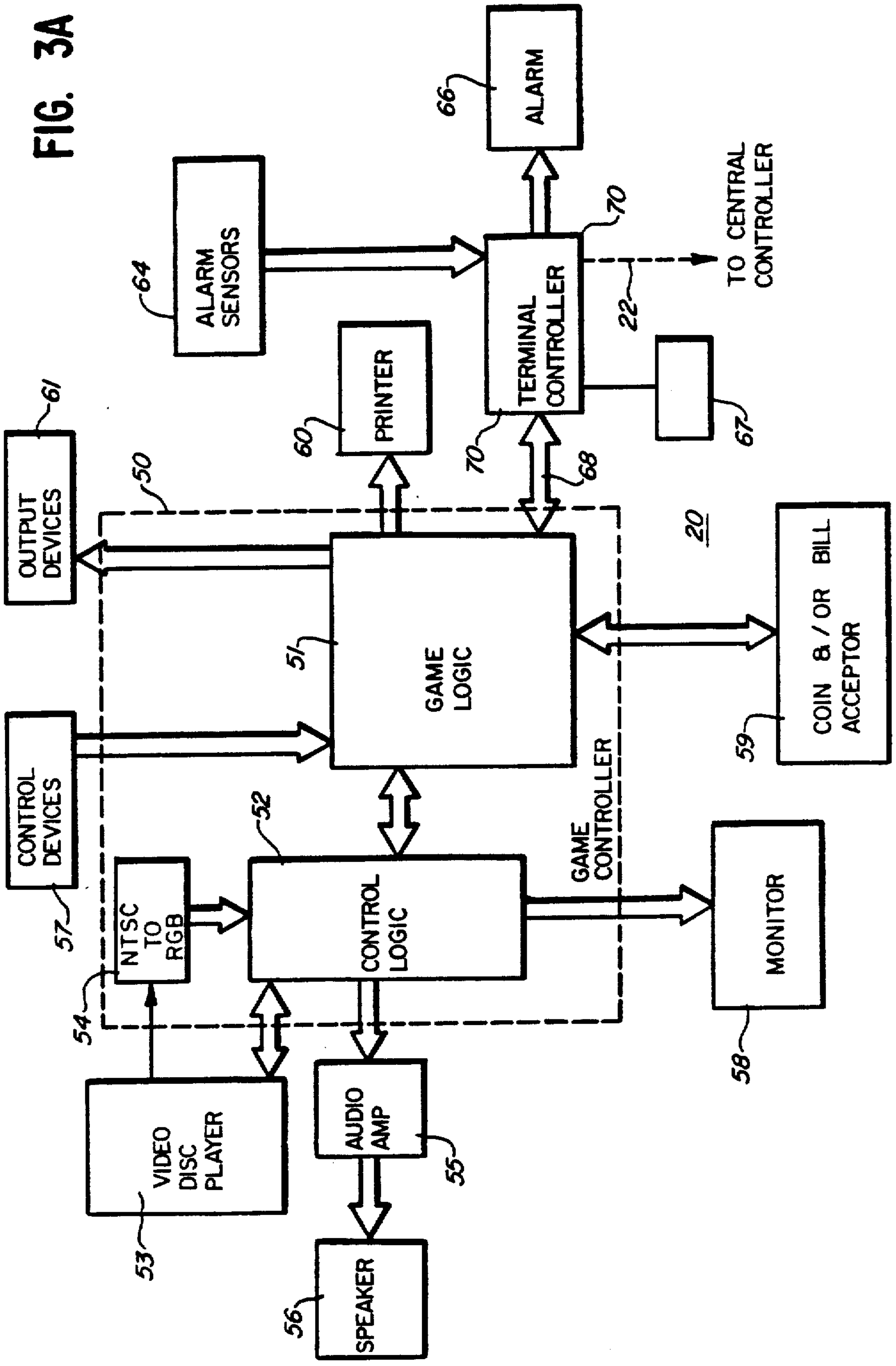
FIG. 3A is a detailed block diagram of a specific embodiment of a secure lottery video game remote terminal.

The operation of the remote terminal 20 may be understood by reference to FIG. 3A which shows a functional block diagram of the remote terminal electronic system. A primary subsystem of the remote terminal 20 is the game controller 50 which includes game logic 51, which performs all functions necessary to control the game according to stored operational conditions. The game controller 50 also includes control logic 52 which controls a video disc player 53 (e.g. an Hitachi 9500SG laser disc player) for playback of high resolution video signals prerecorded on a video disc. Other video recording devices may also be used for storage of prerecorded video signals, for example, digital video systems, videotape, etc. In addition, the control logic 52 couples audio signals to a set of speakers 56 through an amplifier 55, and couples video signals to the monitor 58 under control of the game logic 51. The game logic 51 is coupled, as shown, to a terminal controller 70, and in conjunction with the terminal controller 70, executes all necessary lottery functions. The game controller 50 is further comprised of a NTSC to RGB converter 54 which converts NTSC video signals from the video disc player 53 to RGB signals for application to the video monitor 58.

Player stimulus signals are output from player control devices 57 responsive to player activation of the player control devices, such as the joysticks 35, 36 or pushbuttons 38 or 39 of FIG. 2. The player stimulus signals are coupled to the game logic 51, as shown. In addition, activation control signals are coupled from the coin/bill accepters 59 to the game logic 51 to initiate game play responsive to player insertion of the proper amount. In the illustrated embodiment, a commercially available high speed electro-sensitive rotary (e.g. SCI Systems, Inc., Model 1080-2A) printer 60 is coupled to the game logic 51 to permit printing of lottery tickets under control of the game logic 51. The metallic coated paper used by this type of printer minimizes the risk of alteration and counterfeiting. In the case of high tier winners, the printing of a winning ticket is controlled by a valididation signal from the central controller. A number of output devices 61, such as lights and solenoids, are coupled to the game logic 51, as shown.

The game controller 50 has multiple game selection capability. In the preferred embodiment, one of four games may be selected by the player through the player control devices 57 after activation of the remote terminal by payment of the required fee through the coin/bill acceptors 59. The game controller 50 can operate any of a wide variety of games including real time computer generated video graphics games, games utilizing only prerecorded video signals recorded on a video disc, and games combining real time computer graphics with prerecorded video.

Game programs for such computer graphics games and video disc games are known in the art. The computer control programs involved are stored in program memory and can be downloaded from the central controller 24, through the terminal controller 70 to the game controller 50 to permit changes in the games. There are a wide variety of games which can be utilized.

Computer graphics games which are suitable for the lottery remote terminals include such well-known skill based games as TRON. In a lottery system wherein prize awards are not to be based on skill, these games may be used, for example, by matching a random number to the score generated by the game play. As an alternative, a win or loss determined at the time of activation may be disclosed at some point in the game.

Another highly suitable game is a non-skill game such as Lady and the Tiger which is disclosed in detail in a copending application, filed Aug. 11, 1983, by Martin A. Keane, et al., entitled "Video Gaming Machine and Method Based Upon A Dramatic Narration." In this game the player positions a character before a particular door and once he chooses a door, certain events result, such as appearance of a Lady signifying a win, a Tiger signifying a loss, or an open doorway which leads to the next scene. False clues are sometimes used to enhance play characteristics, for example, the Lady's handkerchief appears in front of a door but may or may not indicate the presence of the Lady. In the preferred embodiment, the win or loss is determined when the remote terminal is activated based upon a pool (to be described in detail hereinafter) for that game.

A novel game approach particularly suitable for the instant lottery system creates the illusion of skill while still determining the outcome at the time the game is started. In a specific embodiment, the player of the game is flying in a spaceship with a cockpit point of view having a selected number of missiles available. The view shows many space objects in the background, occasionally one of the space objects starts becoming larger and moves toward the player becoming a spaceship which is moving rapidly. The player, using the joystick, aims and fires a missile at the spaceship. A "hit" will result in an explosion with a prize value displayed, and shown on a panel on the screen. The process is repeated with a miss merely using up a missile while a hit produces another prize value display. Each missile could follow a curved path which adds realism and the spaceships fly by at varied speed. The player must aim correctly to hit a spaceship, however, as the game proceeds the tolerance for a hit is widened and the explosion of the missile gets stronger to increase the chance of getting a hit. In addition, the number of spaceships increase until it becomes hard to miss. Thus, the level of skill diminishes as the game progresses, as opposed to the conventional practice of increasing difficulty as the game progresses. This gives the player the illusion that a win or loss is dependent upon his skill. In actuality, the game controller completely controls the outcome, such that three identical prize values produce a win of that value. The result, in the preferred embodiment, is determined at the time the game is started based on a pool.

Another type of game that is highly suitable for the instant lottery system is an interactive video disc based game using video image signals and audio signals prerecorded on a video disc. This type of game provides elevated levels of sophistication, quality and realism. Such games, using prerecorded video combined with real time computer graphics, utilizing game control circuitry as shown in FIG. 3A, are known in the art.

A novel game utilizing only prerecorded video signals is particularly suited for the lottery system. In this game, 2 to 5 second sequences (i.e. 60–150 coherent action frames) of "live" game action are filmed and recorded on a video disc. Some computer generated graphics may also be recorded on the disc as well. Appropriate audio sounds are also recorded on the disc in conjunction with the video signals. The prerecorded sequences and audio are manipulated to form game sequences. The computer graphics, either real time or prerecorded, are occasionally inserted between the sequences to fill the video disc player search time.

In a specific embodiment, the game shows a motorcycle ridden through the hilly streets of San Francisco, with the player controlling the motorcycle by moving the joystick right or left to turn it. The object of the game is to catch a limousine and obtain a prize value indicator from the passenger. This is done several times, and a win results when three identical prize values have been obtained. False clues are used to enhance play features, for example, the limousine may be shown ahead of the motorcycle turning a certain direction, thus giving the impression that turning the motorcycle in that direction will improve the chances of catching the limousine. In addition, while the game is played, the audio provides the sounds of a motorcycle and distinctive San Francisco street sounds. The player thus can experience some of the sensations of a high speed motorcycle ride through the streets of San Francisco while playing a lottery.

The terminal controller 70, shown in FIG. 3A, is a separate, secure unit within the remote terminal housing 32 which controls all communications in a secure manner to and from the central controller 24 (see FIG. 1), and handles non-secure communications with the game controller 50. The terminal controller 70 also controls all security functions for the remote terminal 20, directs the printing of tickets, and stores terminal play history and financial data for transmission to the central controller 24, and permits downloading of program code and other critical data from the central controller 74.

In addition, the terminal controller 70 makes the determination for the low tier prize awards and controls the awarding of all prizes. The win values are kept in the terminal controller 70 and are sent to the game controller 51 whenever a game starts. If the terminal controller 70 determines a high tier winner is to occur, it initiates a call to the central controller 24 for validation.

Detailed records of play information are kept by the terminal controller 70 as well as records of exact prize payouts and play frequency data on an hourly basis (i.e. hourly meters). This data is battery backed to safely preserve it and is occasionally transmitted to the central controller 24. The terminal controller 70 includes a central processor for control and processing, a modem for telephone line communications, battery back-up and protection circuitry to deter unauthorized access to its stored information. As shown in FIG. 3, alarm sensor signals are coupled to the terminal controller 70 from alarm sensors 64, located in the remote terminal housing and the premises at which the remote terminal is installed to detect attempts at unauthorized access. In addition, alarm signals generated by the terminal controller are coupled to an alarm 66 as well as to the central controller 24 via the communications medium 22. A cash box lock control solenoid 67 is also provided, as shown, to permit control of the cash box. The terminal controller 70 can partially shut down to a power-down, or sleep, condition to save power, and is powered-up either by a call from the central controller 24 or an internal wake-up signal. The communications medium 22, which in the preferred embodiment is a telephone network, links the remote terminal 20 to the central controller 24 to permit, inter alia, a detailed accounting of terminal activity upon request from the central controller 24. In addition, the terminal controller 70 can initiate and transmit exception messages to the central controller 24 for exceptional conditions, such as unauthorized entry, power outage, etc. Communications between the terminal controller 70 and the game controller 50 is performed via the cable 68 coupled as shown.

Figure 3B:
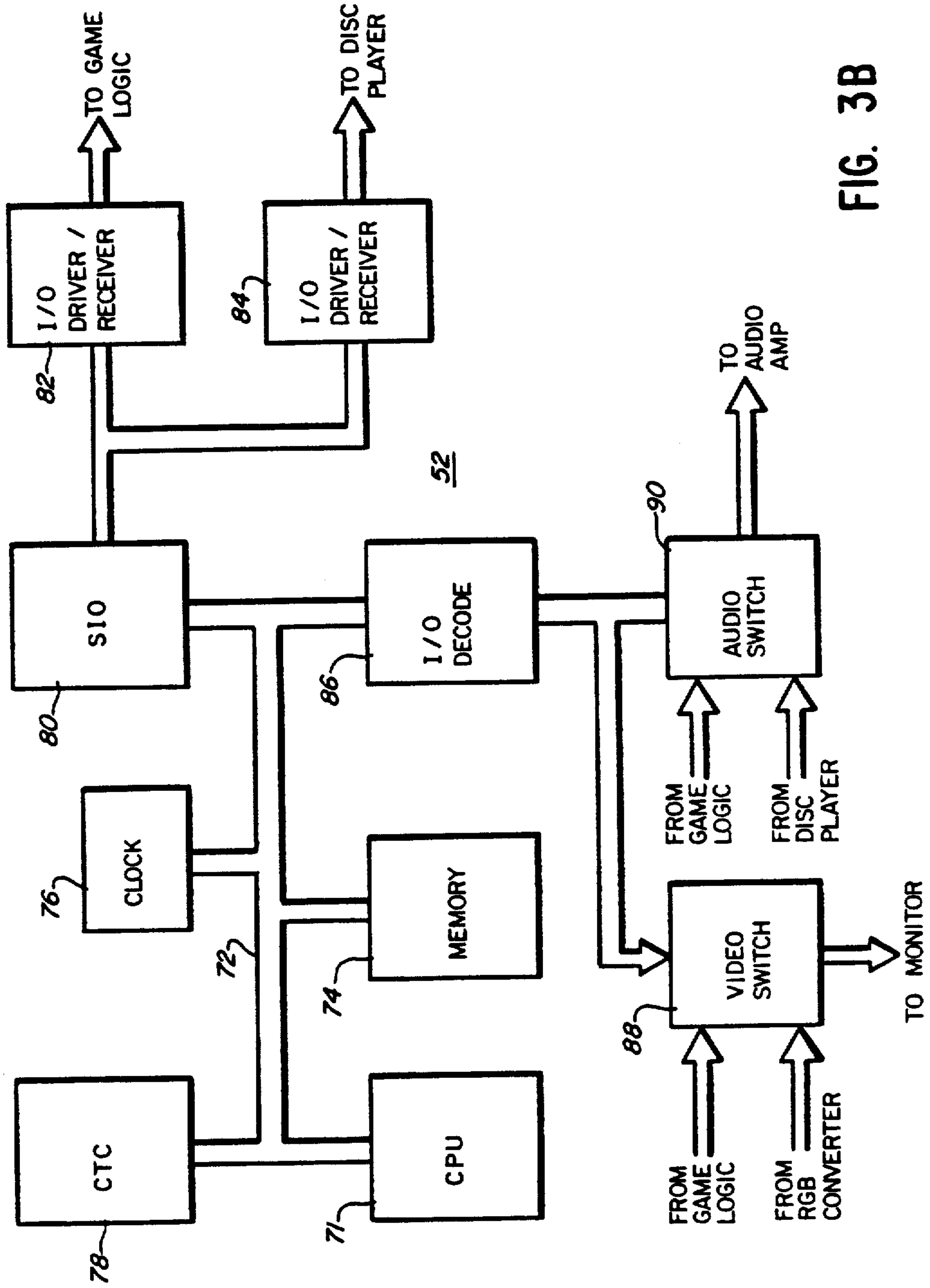
FIG. 3B is a detailed functional block diagram of a specific embodiment of the control logic shown in FIG. 3A.

Referring now to FIG. 3B there is shown a detailed block diagram of the control logic 52 of FIG. 3A. The control logic 52 in communication with the game logic 51, controls the video disc player 53, and switches audio output between audio from the video disc player 53 and audio from the game logic 51. The control logic 52 interrogates the video disk player to determine the current frame location and provides instructions to step the player to the next required location. In addition, the control logic 52 switches between the video signals from the game logic 51 and video signals from the video disc player 53 coupling the selected video to the monitor 58.

During play of a game, player control signals (e.g. representative of joystick position) generated by player manipulation of the player control devices 57 are coupled to the programmed game processor 100 of the game logic 51. The game processor 100 generates appropriate graphics, audio and control signals determined by the game operational conditions. These signals are coupled to the control logic 52 where the programmed processor 81 processes the signals and couples them to the monitor 58 and speakers 56 through the video switch 88 and audio switch 90.

For a video disc game the signals from the game logic 51 are primarily control signals which are based upon the game operational conditions. The processor 81, responsive to the current video frame location on the video disc and to the control signals, generates addressing signals to direct the disk player 53 to the next required video frame location for playback of the appropriate video and/or audio signals. The addressing signals are determined using a table or algorithm which relates the player control inputs to the video image addresses consistent with the game operational conditions. The video and/or audio signals from the video disc player 53 are coupled, under control of the processor 81, to the monitor 58 and the speakers 56 through the video switch 88 and audio switch 90.

The control logic 52 comprises a central processor 71 (e.g. a Zilog Z-80) which is coupled to other circuits, as shown, via a universal bus 72. A memory 74 is provided for program and data storage, comprising read only memory (e.g. Intel 2764) and random access memory (e.g. Hitachi HM6264P). A conventional clock generator 76 is provided to generate required system clock signals, and a counter-timer chip 78 (e.g. a Zilog 8430) provides timing, interrupt, and control signals, with each coupled, as shown, to the bus 72. A serial input-output (SIO) circuit 80 (e.g. Zilog 8440) is coupled, as shown, to the bus 72 to provide serial to parallel, and parallel to serial conversion to interface with the I/O circuits 82, 84. The I/O circuit 82 is an RS232 Driver and Receiver (e.g. Motorola 1488, 1489) which couples output signals to the game logic 51. The I/O circuit 84 is also on RS232 Driver and Receiver for coupling control signals and address signals to the standard control input of the video disc player 53. An Input/Output Decoder circuit 86, comprising a conventional decoder (e.g. 74LS138) and a latch (e.g. 74LS273), couples to the bus 72, as shown, primarily to provide decoded control signals from the CPU 71 to a video switch 88 and an audio switch 90.

The video switch 88 (e.g. Motorola 4066's), based on control signals generated by the CPU 71, switches video signals from either the game logic 51, or the video disc player 53 to the monitor 58. Thus, when computer generated graphics are to be displayed, the switch 88 couples the signals from the game logic 51 to the monitor 58, and when prerecorded video is to be displayed, signals from the RGB converter 54 are coupled to the monitor 58. Similarly, the audio switch 90 (e.g. Motorola 4016) switches audio signals from either the game logic 51, or the video disc player 53 to the audio amplifiers 55 and thus to the speakers 56, under control of the CPU 71. The audio switch 90 is capable of controlling each channel of stereo sound separately, thus, one channnel from each source may be simultaneously coupled to the audio amplifiers 55.

Figure 3C:
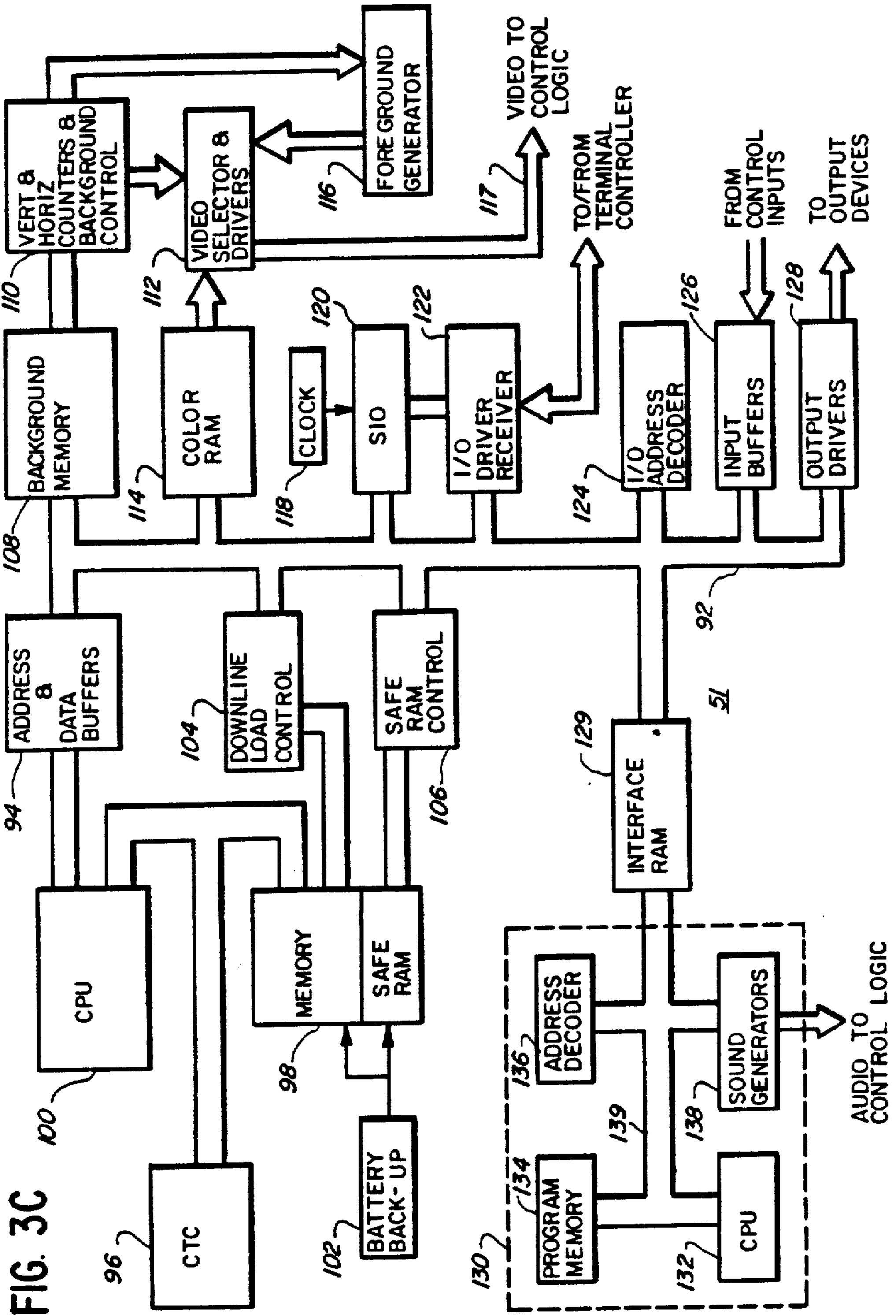
FIG. 3C is a detailed functional block diagram of a specific embodiment of the game logic shown in FIG. 3A.

In FIG. 3C, there is illustrated a detailed block diagram of the game logic 51. A central processing unit 100 (e.g. Zilog Z-80) is coupled, as shown, to a bus 92 through a conventional address and data buffer 94 (e.g. Motorola 74LS245, 74LS244). The CPU 100 is also coupled to a counter-timer circuit 96 (e.g. Zilog 8430) which generates interrupt signals and to a memory circuit 98, as shown. The memory circuit 98 provides storage for program code and data, and is comprised of read only memory (e.g. Intel 2764, 27132) and random access memory (e.g. Hitachi HM6264) which is protected by a battery backup circuit 102. Part of the random access memory is safe RAM, which is protected by a security program, for safe storage of important machine meter data. In addition, part of the RAM is accessable, as shown, to downline load control circuitry 104 to permit downline loading of new program code and data. The safe RAM is controlled by the CPU from the bus 92 through a safe RAM control circuit 106. The bus 92 couples, as shown, to video generation circuitry composed of a background memory 108, vertical and horizontal counters 110, a color RAM 114, a video selector and driver circuit 112 and a foreground generator 116. The video generation circuitry creates video signals based upon control signals from the CPU 100 which specifies the images to be displayed and their locations on the screen. The monitor 58 ultimately converts the signals to visible game and diagnostic images. A detailed description of the video generation circuitry is disclosed in a co-pending application filed Aug. 8, 1983 by John J. Pasierb, et al., Ser. No. 520,762, and assigned to the instant assignee. A video output 117 from the video driver circuits 112, couples video signals to the video switch 88 of the control logic 52 (see FIG. 3A).

A conventional Serial Input-Output (SIO) 120 circuit is coupled, as shown, to the bus 92 to provide serial to parallel and parallel to serial conversion for interfacing to the I/O circuits 122. The I/O circuits 122 comprise conventional RS232 Driver and Receiver circuits for communications with the terminal controller 70 on cable 68. A baud rate clock 118 provides clock signals to the SIO circuit 120. A conventional Input/Output address decoder circuit 124 (utilizing, e.g. 74LS138, 74LS139) is also coupled to the bus 92 to provide address decoding for the SIO 120, and for input buffers 126 and output drivers 128. The input buffers 126 couple signals from the player control devices 57 through the bus 92 to the CPU 100, and signals from the printer 60 and the coin/bill acceptor 59. The output drivers couple signals from the CPU 100 through the bus 92 to control the output devices 61 and other outputs, such as printer 60, lights, solenoids, etc.

In addition, a sound generator system 130 is coupled to the bus 92 through an interface RAM 129, as shown. The sound generator system 130 primarily comprises a central processing unit 132 (e.g. Zilog Z-80), coupled to a bus 139, with conventional program memory 134 (containing ROM and RAM) and address decoding 136 also provided, as shown. The CPU 132 controls two programmable sound generators (e.g. General Instruments AY-3-8912) to produce highly complex sounds upon requests from the CPU 100, which are coupled to the audio switch 90 of the control logic 52 (see FIG. 3A).

Figure 4:
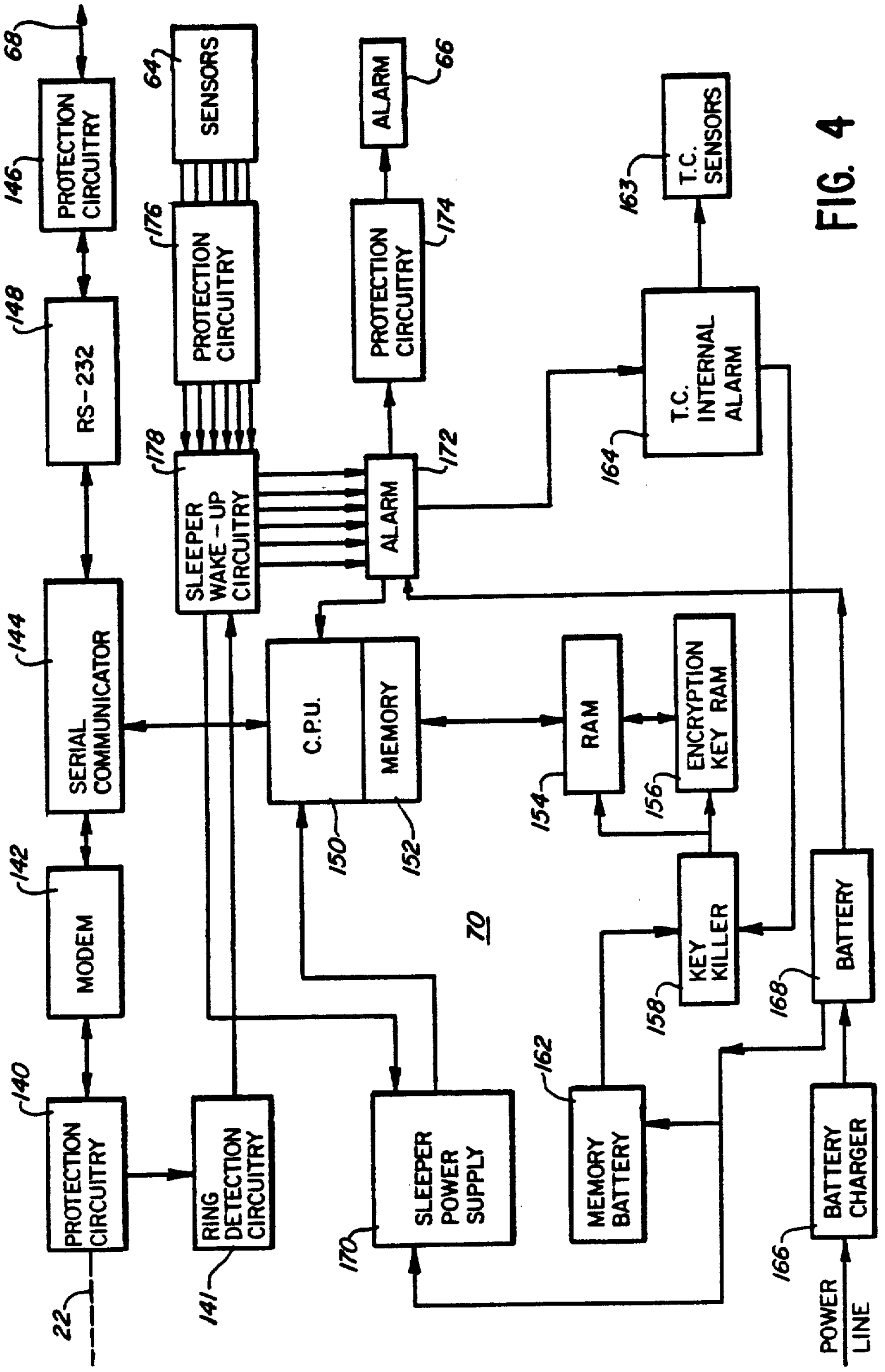
FIG. 4 is a detailed block diagram of the specific embodiment of the terminal controller shown in FIG. 3.

Referring now to FIG. 4, there is illustrated a detailed block diagram of the terminal controller 70 shown in FIG. 3. A two-way communications line 22, is coupled from the central controller 24 through a conventional input protection circuit 140 to a modem 142 (in the preferred embodiment a 300 baud, auto-answer, auto-dial modem chosen for cost effectiveness), as shown, to permit reception or transmission of encrypted data. A ring detection circuit 141 detects an incoming call and couples a detection signal to a wake-up circuit 178, as shown, thereby activating the wake-up circuitry in the event that the terminal controller 70 is in a power-down state. The wake-up circuitry generates an actuation signal which is coupled, as shown, to a battery backed sleeper power supply 170 providing power to a terminal controller processor 150.

The modem 142 is coupled through a conventional serial communicator 144 to the terminal controller processor 150, as shown. In addition, the cable 68 is coupled from the game controller 50 (see FIG. 3) through conventional input protection circuitry 146 to a standard RS232 interface 148 to permit communications between the terminal controller 70 and the game controller 50. The interface 148 couples signals through the serial communicator 144 (in the preferred embodiment, comprising Zilog 8440 SIO's) to the terminal controller processor 150, as shown. The processor 150 is preferably a low power processor, such as a Zilog Z-80, and is coupled directly to a program memory 152, as shown. The memory 152 includes ROM and battery backed up, down-loadable RAM which permits alteration of program code from the central controller. In addition, a battery powered RAM 154 is provided to permit safe data storage. A battery powered encryption and decryption key RAM 156 permits storage of an encryption or decryption key used for encrypting or decrypting data for secure communications between the terminal controller 70 and the central controller 24. The encryption key stored in encryption key RAM 156 is utilized by the processor 150 to encrypt any information which is to be transferred from the terminal controller 70 to the central controller 24 and the decryption key is used for decrypting received data from the central controller 24. The encryption and decryption key RAM 156 and RAM 154 is also coupled to a memory battery 162 through a "key killer" circuit 158 which cuts off power to the RAM 156 and 154 in response to an attempt at unauthorized access to the terminal controller 70, thereby erasing the encryption and decryption key and all other RAM data. The unauthorized access is detected by sensors 163 coupled to a terminal controller internal alarm 164 which generates an alarm signal which is coupled as shown to the key killer 158.

The power line, constituting the primary power source, is coupled as shown to a battery charger 166. The battery charger 166, is coupled to a battery 168, and thus continuously charges this battery to provide for battery back-up during power line failures. The sleeper power supply 170 is coupled to the battery 168 to provide short-term back-up power for the terminal controller processor 150. The memory battery 162 is coupled, as shown, to the battery 168, and to the sleeper power supply 170, both of which charge the memory battery 162. The battery 168 also provides power to the alarm circuit 172, which generates an alarm signal in response to the detection of unauthorized access to the remote terminal housing 32 by any of a number of sensors 64. The alarm signal is coupled to the terminal controller internal alarm circuit 164, the terminal controller processor 150, and to a protection circuit 174 which drives an alarm transducer 66 (e.g. bell, light, etc.). The alarm sensor signals are coupled through a conventional protection circuit 176 and through a sleeper circuit 178 to the alarm circuit 172. An alarm sensor signal causes the sleeper wake-up circuit 178 to activate the sleeper power supply 170, if the system is in the power-down mode. Normally, the processor 150 determines if the alarm 66 should be activated and inhibits the alarm 66, if it should not be activated. If the processor 150 fails to activate, the alarm 66 will not be inhibited. The processor 150 also determines if a call to the central controller is required and initiates the call when appropriate.

The terminal controller circuitry described hereinabove, incorporates numerous novel security features to provide for secure functioning of the remote terminal. In addition to battery back-up and protection circuitry to permit erasing the encryption keys, the terminal controller 70 is enclosed in its own tamper resistant enclosure with sensors 163 attached to detect tampering. Other sensors 64 are positioned within the remote terminal housing 32 and at all doors to detect penetration of the housing 32. The terminal controller 70 includes door sensors, AC power sensors, and phone line connection sensors. In addition, the terminal controller 70 allows for connection to the burglar alarm of the premises. The terminal controller 70 can also relay a message indicating detection of tampering or power failure to the central controller as well as to react locally with alarm 66, shut-down of the remote terminal 20, or erasure of secure information. All communication between the terminal controller 70 and the central controller 24 are sent in encrypted form.

A public key encryption method known as RSA public key encryption can be utilized as a high security method of encryption. This scheme involves the use of a secret key by each controller for decryption. The encryption key is made common knowledge but the decryption key is not available and is kept secure in the decryption key memory 116 of the terminal controller 70. This RSA method is known to be computationally intractable. This method may be used only for highly sensitive data such as transmission of medium security encryption keys or high tier winners because it is computationally complex and time consuming.

A second encryption method which may be used is the widely known DES (Date Encryption Standard) method developed by the National Bureau of Standards. This method is used for higher speed encryption of medium security data, such as low security encryption or decryption keys or seed data. To improve security, multiple levels of DES encryption may be used. Simpler, but less secure encryption methods which are known in the art are options for low security, high speed data transmissions, such as meter data, or program code.

Figure 5:
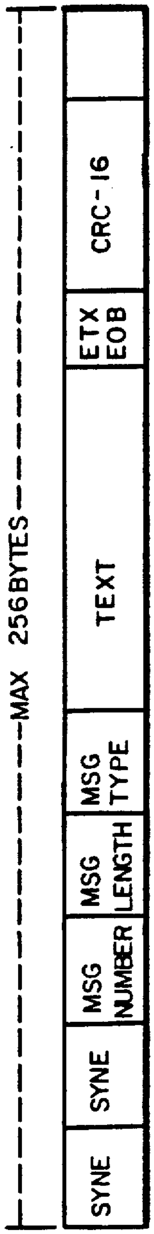
FIG. 5 is a diagram of a specific message block format utilized in the illustrated embodiment.

A standard message format is utilized for transmissions between the terminal controller 70 and the central controller 24, as illustrated in FIG. 5. A block with a maximum message length of 256 bytes of eight bits each is used. As shown, the first two bytes are synchronization codes, followed by a message number, then the message length. The message number is an eight bit number which is incremented after each message is sent, and is used for determining error recovery on missing blocks as well as for security to detect unauthorized communications. The message length is the number of bytes used for the text segment of the block with a maximum of 247 bytes per block. This text segment is encrypted for all transmissions. Following the message length is a message type code, with four types used in the illustrated embodiment. They are (1) STX-data to follow, (2) ACK-previous message correctly received, (3) NAK-previous message not correctly received, and (4) XOF-retransmit previous message after ten seconds. After the text bytes, an end of text or end of block code is inserted followed by two bytes of cyclic redundancy code and a guard end byte. If a message is more than 247 bytes, multiple blocks are used for the message.

Among the secured functions performed by the terminal controller processor 150 is the determination of prize pools to insure accurate prize payouts guaranteeing a predetermined total prize value within a preselected group of plays, referred to as a "pool." In a preferred embodiment, each pool contains a million plays and each pool is further divided into a thousand mini-pools of a thousand plays each. This multi-level pool system may be expanded to three or more levels as needed. For example, a major pool for high tier winners, secondary pool for intermediate winners and a mini-pool for low end winners.

The mini-pool is used to implement a fixed low-end prize structure such that within a small number of plays (i.e. 1000) there is a preselected amount of low-end prize value (for example, low-end winners could include all prizes of $25 or less). Thus, there is a known amount of low-end prize value in each mini-pool. This ensures that each terminal will have its share of winning value and may be accomplished by using a predetermined number of each win value or by a distribution of different wins having equal total prize values. The central controller 24 assigns a mini-pool for each particular game to each remote terminal 20 from its larger supply of 1000 mini-pools. Since each remote terminal 20 has a number of different games, each terminal controller maintains an equal number of separate mini-pools. Each time a mini-pool is completely used, the terminal controller 70 initiates a telephone call to the central controller 24, reports on the completion of the mini-pool, and a new mini-pool is assigned by the central controller 24. When all 1000 mini-pools of a given pool have been assigned, the central controller 24 then creates a new pool.

Intermediate and large or grand prize winners are generally not sufficient in number to permit even one of them in each mini-pool. Thus, there is a selected set of these high tier winners in each pool, and some mini-pools will contain such a large prize while some may contain none.

The pools and mini-pools are determined based on random seed numbers. In the preferred embodiment, pool seeds, and mini-pool seeds are used which determine the outcome of every play. The digits for the pool seeds are created at the instant when the central controller needs to start a new pool. These digits are generated using a pseudo-random number generator, such as are known in the art, using an input from the computer's clock. As a result, there is no way to predict in advance the randomization of a given pool.

When a mini-pool seed is requested by the terminal controller 70, a value from the terminal controller clock is transmitted with the request. The digits of each mini-pool seed are generated at the central controller 24 using the pool seed and the terminal controller clock value to feed a random number generator. The resulting mini-pool seed is then transmitted to the terminal controller 70. In addition, a high tier win is reserved to be included in the mini-pool. This seed is then used to randomize the mini-pool thus determining which players win both high tier prizes and low-end prizes. This is done by using the random seed to shuffle the wins into a random order based on a randomizing algorithm, such as are known in the art, so that the distribution of wins within each pool will not be predictable. A suitable randomizing algorithm is the linear congruential method or a multiple pass variation of this method. The random number seeds and the randomizing algorithm are also stored by the central controller 24 to permit the central controller 24 to recreate the distribution of wins for use in validation. It should be noted that the winners in the games can also be generated using other methods, for example, where each individual play on the remote terminal is an independent uncontrolled random event.

The terminal controller 70 is also involved in the validation process of high tier wins. When the terminal controller 70 determines that a high tier win will occur for the play of the game currently started, the terminal controller calls the central controller 24 to request validation. The central controller 24 checks to verify that the high tier win is correct and that the allotment of high tier winnings for that terminal has not been used up. If the win is valid, the central controller 24 will transmit a win amount and validation code to this terminal controller 70. The terminal controller 70 sends this information to the game controller 50 for printing on a lottery ticket. The validation code on the ticket can be used to verify authenticity prior to payment. If the high tier prize was not correct the central controller 24 can send a shut-down message to the terminal controller 70, which then shuts down the remote game terminal. If communication between the terminal controller 70 and the central controller 24 cannot be made before the end of a game, the terminal will not print a winning lottery ticket but instead the remote terminal notifies the player that he has won a prize and prints a special ticket that he must take to a validation center to determine the value of the win. If the printer is disabled, the terminal will void the play and the player will obtain a refund. The terminal controller 70 can then send a message to the game controller 50 disabling the game until communication can be established.

In an alternative mode, a high tier winner may enter his name and address, or other information into the remote terminal 20 using the player control devices 57. The terminal controller 70 then transmits this information to the central controller 24 thus electronically registering the winner. The game controller then prints a receipt but the winner need only go to a claim center to obtain payment. This electronic claim process improves the security of the claims process.

Terminal controller 70 serves also as a storage location for collection of various remote game terminal meter data, such as, the number of games played, money in the terminal, the amount of winnings paid out, and other data. The terminal controller 70 periodically polls the game controller 50 to make sure it has up-to-date meter data. The hourly meter data is kept by the terminal controller 70 in battery backed RAM 154 until it is requested by the central controller and is then transmitted. Once the central controller 24 has received the data it sends a message back to the terminal controller 70 that tells it that the meter data is safely stored in its memory, and that the terminal controller storage is freed up for reuse. The integrity of the meter data is also maintained across the telephone transmission lines through the use of a cyclic redundancy code (e.g. CRC-16 method as used in the IBM binary synchronous communications protocol). The addition of the cyclic redundancy code to the data is a commonly used method for verifying the correctness of transmitted data. If an error is detected at the receiving end, the central controller 24 sends back an error message to the terminal controller which then retransmits the data until it gets through correctly.

Additional security features of the terminal controller 70 involve detection and transmission of exceptions such as alarms, printer empty, malfunctions, power failure, and others. When an exception is detected, the terminal controller 70 determines the severity of the exception and sends a message to the central controller for the more serious exceptions while logging the less severe exceptions for later transmissions.

The program set for the terminal controller uses a commercially available operating system for linkage of the various tasks operating within the terminal controller. This operating system is called AMX, for "A Multitasking Executive" (marketed by KADAK Products, Limited). It allows for up to 63 concurrently running tasks of various priorities to send messages and schedule other task on a real time interrupt driven basis. It includes user tasks, such as real time clock/calendar, task scheduling on a time of day or a periodic basis, buffer management, intertask communication with buffering, and many other features. Under the operating system there are three main types of programs: restart procedures, interrupt service procedures, and user tasks. The terminal controller also has a resident library of commonly used re-entrant subroutines.

The scheduling algorithm of the operating system for task execution is absolute scheduling, so that the highest priority task is given all the time that is needed and only when it gives up the processor is the next highest priority task allowed to run. This continues down to the lowest priority task. There are no two tasks with equal priority. This means that a task of high priority will inhibit the operation of all tasks of lower priority.

Within the terminal controller 70, in the preferred embodiment, there are three types of true interrupts and one type of "polled" interrupt. The three true interrupts are the clock interrupt, the I/O character interrupt, and the non-maskable interrupt. The one polled interrupt is the alarm interrupt. The terminal controller 70 in the form of the preferred embodiment, uses the Z-80 mode two interrupts, or vectored interrupts, which allows the interrupt routines to reside anywhere in memory.

The terminal controller 70 generates regular clock interrupts of a programmed frequency, which in a preferred embodiment is 100 hertz. The operating system is set up to count down any integer number of clock interrupts into one system tick time (the basic system time of which all software timers are multiples). For the preferred embodiment of the terminal controller, the 10 milliseconds (100 hertz) clock interrupt is used as the system tick time. At tick time, tasks are reevaluated for priority of execution, all counters are decremented, and the time of day is incremented.

A vectored interrupt mode is used for all external communications. Thus, the terminal controller 70 can automatically jump to various routines. In general, the character input routines will read a character from a port and write it through a circular list, and the output routines will read a character from a circular list, and write it out to a port.

A non-maskable interrupt will occur only when the power has been removed from the terminal controller 70 for long enough for the battery to be low. At that time the terminal controller will initiate a phone call to the central controller advising it of the situation, and will then go inactive.

The alarm interrupt is actually a polled interrupt as it doesn't actually interrupt the processor, but instead is polled during clock interrupts. An I/O port contains various bits indicating various machine statuses such as door open, or power outage. The I/O port also has one bit which is latched whenever the status of that port changes, so a read of that bit during clock interrupt will quickly determine if any actions are required. If no change has occurred in the latched bit, the terminal controller 70 returns to execute the highest priority current task. If the bit indicates that a change has occurred, the interrupt routine stores the alarm condition and schedules an alarm task to be run.

The terminal controller 70 can modify its own programs while it is operating based upon data received from the communication line 22. This is typically used to correct small bugs which are discovered after the machine is in the field. It can also be used to generally enhance machine programs from the central controller 24 or write new game programs from the central controller 24 without requiring direct reprogramming.

To allow for this program downline loading, the terminal controller 70 tasks are defined with several non-existent tasks in the operating system task table. The non-existent tasks are simply defined to the operating system so that their entry points are at some predefined address that initially contains a return instruction. Then tasks are set up so that the non-existent tasks are never scheduled to run. These holes in the operating system task table are of various levels of priority to allow for various priority options to be added.

When a task is to be added, an appropriate section of unused memory is first filled with the new task received from the communications line 22. Next, the operating system task table is modified to include the new task. The new task is scheduled to run by either directly modifying the operating system task table or by setting up conditions that cause the existing task to schedule the new task to run.

Various routines make up the terminal controller software including, the restart routines, the interrupt service procedures, the high priority tasks, and the low priority tasks. The high priority tasks include those that recognize communication, sensor, or clock oriented events, and then pass control to a central message switcher task. The message switcher task then calls the routine that can process the message involved. This allows for modular software.

Sensor events (e.g. door open, character arrival, etc.), communications events (e.g. messages that arrive on either the communication line 68 to the game controller or the communication line 22 to the central controller), and clock events (e.g. the hourly meter store, the daily meter store, etc.) send messages to the message switcher task which calls various event handler tasks which actually process the events.

Most of the work is done by the event handler tasks, which include routines to determine win values, and to create messages for sending to the game controller 50, or central controller 70. All these routines use a common library of reentrant subroutines. The various tasks are arranged in order of priority with the communication sensor and clock events being either interrupt driven or of extremely high priority, running on a polled basis from the clock interrupt routine. Next in order of priority of tasks is the message switcher, which accepts the request for processing and prioritizing the events, and then calls the appropriate routine to handle each event. The subroutines of the message switcher may determine that other processing must be done to complete the processing of the events, and may reschedule the message switcher repeatedly. The lowest priority tasks are routines which are completely noncritical with respect to time, such as the terminal controller self checking routines which verify the proper operation of the terminal controller 70 and which run when the terminal controller has nothing else running.

A number of restart routines are used that are executed only at system start-up which perform such tasks as device initialization, setting time of day, setting counter timers, and so forth.

When the terminal controller 70 first begins operation at power-up or restart, there is a jump instruction to jump to the AMX operating system entry point. The operating system does initialization and then calls the restart routine. The restart routine sets the processor interrupt mode, programs the input ports and programs the clock interrupts. The restart routine then determines the cause of the restart and calls the appropriate subroutine for that type of restart.

Under the AMX operating system, each interrupt must have its own interrupt routine. The interrupt routines include the following routines.

A clock interrupt service procedure routine first stores register values and then checks the alarm I/O port to determine if an alarm has occurred, and then reads and sets the alarm ports if an alarm has occurred. The program then schedules the alarm handler task routine if an alarm has occurred and then jumps to the standard operating system clock handle routine.

A serial input service routine is used to read in characters in response to a character interrupt and then writes the character to a circular list associated with the input line. This provides buffered input of up to 255 characters on all incoming serial communications lines. After the operation is completed, control returns to the task that was interrupted.

A serial output interrupt service routine is used to check the output circular buffer for a character for each line, and then write the character to the output port associated with the output line if there is character, and returns from the interrupt immediately if there is not. This provides buffering of up to 255 characters on all outgoing serial communications lines. After the operation is completed, program control quickly returns to the task that was interrupted. The routine is initiated when a transmit buffer empty interrupt occurs causing the terminal controllers vectored interrupt mechanism to vector to the serial output program. There is one entry point for each serial input line and each entry point sets up registers for line dependencies and jumps to the standard character output handler.

There are a number of functions where a table system is utilized and where a constant data file area is needed (e.g. the central controller's phone number, the encryption keys). Thus, certain data areas are linked into memory to provide the necessary data fields. The data areas include the following:

A custom data area is used to store data that makes one terminal controller different from another, such as the central controller phone number, encryption keys, decryption keys, etc. Another data area is used to store variables that are used by various routines but which are not defined in any other manner. Another data area is used to hold finite state tables that are used to define the operation of the message switcher routine. They are separated from the code to allow for quick changes to be made for the operation of the protocol from the central controller without major changes to the code.

The task routines are stored in order of the priority of execution so that higher priority tasks are always executed before lower priority tasks. The task routines can be described in general as follows:

A clock handler routine is the highest priority task in the system. This task updates the time of day and calls a subroutine called CLKSHED, which checks to see if periodic tasks are to be scheduled. It is the highest priority task because the clock would be corrupted if it did not run each and every clock interrupt.

Another routine T10TSK is used to test each serial line status every 10 system ticks and if it is not transmitting, the routine reads a circular list for a character. If there is a character, the character is written to the output port. If there's not a character nothing is done. The output serial lines are interrupt driven and therefore do not require attention while they are running. However, some method is needed to start the line each time another message is to be sent, thus the need for this routine.

An alarm condition task routine ALMTSK is a routine which determines the type of alarm which has occurred, and then sends a message to the message switcher informing it which alarm has occurred. The task is scheduled by the clock interrupt service routine whenever an alarm condition is detected.

A central controller communications task CCCIRCUIT is used to establish communications with the central controller and controls such things as dialing the phone, exchanging passwords, and terminating the communication in an orderly fashion. A ring detection signal or a flag showing that a call is to be initiated causes entry to this task routine.

A data link layer task routine CCDATALINK, scheduled and terminated by the CCCIRCUIT routine, handles the acknowledge and no acknowledge of messages, the CRC calculation and the block formatting of messages for communications with the central controller.

An incoming message task routine CCINLINK is used for handling the incoming communications from the central controller. This routine waits for detection of two sync bytes then inputs one communication block and passes its address to the communications data link routine. This routine is scheduled and terminated by CCCIRCUIT and communicates with the CCDATALINK routine.

A communications outgoing task routine CCOUTLINK handles outgoing messages and transmits the two synchronization bytes, message number, message length, message type, the text, the ETX or EOB prefixes, and the CRC code. This routine is scheduled and terminated by the CCCIRCUIT routine.

A game communications task routine COMGAME, scheduled by the message switcher routine, handles all communications bi-directionally with the game controller. Its operation consists of getting the message on the communications line and sending the message to the message switcher routine, or fetching a message from another task and sending the message to the game controller.

A meter task routine MTRSK reads the meter values and stores them for transmission to the central controller the next time the communications with the central controller is established. This task is automatically scheduled every hour by the operating system clock handler.

A message switcher task MSGTSK is a major task within the terminal controller software. Various high priority tasks sense events requiring some response from the terminal controller and send the message switcher prioritized messages that the message switcher must handle. The message switcher looks at the message number of the incoming message, looks up the number in a table of subroutines, and calls the subroutine that handles the message. The subroutine processes the message, sets the various appropriate flags, and occasionally reschedules the message switcher to run with the new message that the subroutine has created. This permits quick modification from the central controller of the tables to alter the operation of the terminal controller with minor or no impact on other routines.

A memory integrity task MEMTSK is the lowest priority task in the system. This task verifies the integrity of the memory and informs the alarm handler if an error is detected.

Also stored within the memory of the terminal controller is a resident library of commonly used routines which are reentrant so that they may be used by more than one task. The resident subroutine library includes the following routines.

A routine called INITLOAD is used to get characters from the game controller interface and load them into RAM. No security is used for this transfer and this routine is used only at system start-up to load the rest of the non-ROM based routines into memory.

A routine called INSTALL is used by the central controller for installation of the terminal controller at the agent's sites. The central controller enters values such as the phone number of the central controller into the terminal controller's memory. Once the terminal controller 70 has successfully finished communicating with the central controller 24, a fuse is blown, completing the installation process and the terminal controller 70 becomes fully operational.

Another routine referred to as the Buffer Manager routine controls access to groups of temporary buffers that may be needed by various tasks from time to time. This routine is part of the AMX operating system.

Another routine called CLKSHED is called once every second by the time/date routine within the AMX operating system. This routine checks the current time to see if any of the tasks that are to run at certain times are to be run at that time and if so schedules them to run.

A routine GETTIME takes the clock/counter values from the clock/calendar circuitry and sets the values in a buffer.

A SETTIME subroutine sets the clock/calendar circuit with the time and date from a time/date buffer.

A GETCC subroutine fetches a character from the circular list, or waits for the next character if there isn't an existing character in the list.

A PUTCC subroutine writes a character to the circular list or waits until there is a location available and then writes the character.

A CRCGEN subroutine is used to generate CRC code characters.

A SAVREG routine is a general purpose register saving routine which saves all registers and flags on the stack and then returns to the position at which it was called.

A RSTREG subroutine is a routine which takes the registers and flags that were put into the stack by the SAVREG subroutine and restores them to the registers.

A POOLGET subroutine takes a pool seed and iteration number as an input and returns a win value after being called.

A DECRYPT subroutine is a general purpose decryption routine that is called whenever decryption is required. It takes an encrypted buffer and decrypts it with the currently active decryption key, utilizing the specified encryption level. The result is placed into a buffer which is then returned to the calling program.

A ENCRYPT subroutine is a general purpose encryption routine. Whenever a buffer needs encrypting, this routine is called with the address of the buffer and the level of encryption to be used. This routine then encrypts the buffer and returns the address of the encrypted buffer to the calling program.

A DIAL subroutine dials the phone to call the central controller.

A ANSWER subroutine answers the phone when the central controller calls.

A library of subroutines for use by the standard compiler is also part of the run time library.

The central message switcher task calls the event handler subroutines on a one at a time basis to process each event as it occurs. There is one event handler routine for each condition to be handled. The event handler subroutines that are used include the following routines.

A MSGPOL routine is called by CCCIRCUIT whenever a poll message is received from the central controller. It interprets the message and creates an appropriate message for transmission back to the central controller. It then schedules the message switcher for the transmission of the message to the central controller.

A MSGMD1 event handler subroutine is called whenever a MD1 (i.e. marketing and accounting data) message is to be transmitted to the central controller and sends the message to the CCCIRCUIT routine for transmission.

A MSGAOU event handler routine is called whenever an AOU (Acknowledge OUtgoing message) message is received from the central controller. This means that the previous message sent by the terminal controller has been fully processed and the buffer space that is used may now be reused by the terminal controller.

A MSGHDR event handler routine is called by the message switcher whenever an hourly meter data request is received from the central controller. It interprets the request and creates an hourly meter data message for transmission back to the central controller, and then schedules the message switcher for the transmission of the MD1 message to the central controller.

A MSGHTD subroutine sends the hourly data transmission message to the CCCIRCUIT routine for transmission to the central controller and is scheduled by the message switcher routine.

A MSGDOR routine is called whenever the condition of one of the game doors is changed and sends a door open message to the central controller. This door change condition is detected by the alarm task ALMTSK which schedules the message switcher to run the MSGDOR routine. The MSGDOR routine formats the message and sends it to the CCCIRCUIT routine for transmission to the central controller.

The MSGDRC routine is called by the message switcher in response to a message from the central controller to control the condition of the cash box door solenoid. It can lock or unlock the cash box, depending upon the content of the message.

A MSGINV event handler subroutine is called by the CCCIRCUIT routine whenever an invoice message is received from the central controller. The invoice message consists of the information necessary for the printing of the agent's invoice. The MSGINV routine formats the agent's invoice and prints it. A AIN (Acknowledge INcoming message) message is then scheduled to be sent to the central controller.

A MSGAIN routine creates an AIN message which is sent to the CCCIRCUIT routine for transmission of the AIN message to the central controller. This message informs the central controller that various messages have been correctly received and processed.

A MSGMPR routine is called by the Pool Manager routine whenever one of the minipools is low on win values. A phone call to the central site is then initiated and an MPR message is transmitted.

A MSGMPS event handler routine is called by the CCCIRCUIT routine whenever an MPS message is received from the central controller. This routine updates the minipool values for use in determining future win values.

A MDGBWD event handler routine is scheduled by the message switcher whenever a big winner has occurred and results in a sending of a message through the CCCIRCUIT routine to the central controller.

A MSGBWV subroutine is called by CCCIRCUIT routine whenever a big winner validation message is received from the central controller. This message is then processed and sent to the big winner printer for printing of a big winner ticket.

A MSGECR subroutine is called by the message handler and generates the electronic claim receipt reject message sent by the CCCIRCUIT routine from the terminal controller to the central controller. If the printer fails or communications with the printer is lost, the winner will receive a ticket which must be validated at a later date.

A MSGECD routine is scheduled by the message switcher to send an electronic claim data message through the CCCIRCUIT routine from the terminal controller to the central controller.

A MSGTPF event handler subroutine which is scheduled by the alarm task ALMTSK is a routine which formats a ticket printing failure message which is then handled by the CCCIRCUIT routine to send a message from the terminal controller to the central controller. In case of the printer failure together with communication loss with the central controller, the player will receive his money back.

A MSGCPO event handler subroutine is scheduled by the message switcher in the event of a ticket printer failure and generates a claim printer order message. The message is sent by the CCCIRCUIT routine to the central controller.

A MSGTPA event handler subroutine is scheduled by the message switcher when a message is received to handle ticket printer acknowledge messages.

A MSGEXD event handler subroutine is scheduled by the message switcher when an exception has occurred and sends a message which is an exception data message to the CCCIRCUIT for transmission from the terminal controller to the central controller.

A MSDMSD event handler subroutine is scheduled by the message handler and sends market survey data from the terminal controller to the central controller by formatting a message and handing it to the CCCIRCUIT routine for transmission to the central site.

A MSGCMD event handler subroutine is scheduled by the message switcher in response to reception of a command message from the central controller and passes the appropriate message to the required routine.

A MSGCMR event handler subroutine is scheduled by the message switcher and formats the command response to the central controller in response to command data received from the central controller. The CCCIRCUIT routine then handles transmission of the response.

A MSGPLH event handler subroutine is scheduled by the message switcher in response to a message received from a central site. The routine solicits marketing, accounting (same as MD1) and hourly data from the terminal controller and constitutes the first daily poll. The MSGMD2 event subroutine is then scheduled to run.

The MSGMD2 event handler subroutine generates a message for transmitting the marketing, accounting and the hourly data from the terminal controller to the central controller, then hands the message to the CCCIRCUIT routine for transmission.

A MSGPWD event handler subroutine is scheduled by the message switcher in the event of a printer failure. If the printer fails or power goes down, the remote terminal terminates play before informing the player of a win and returns money to the player.

Figure 6:
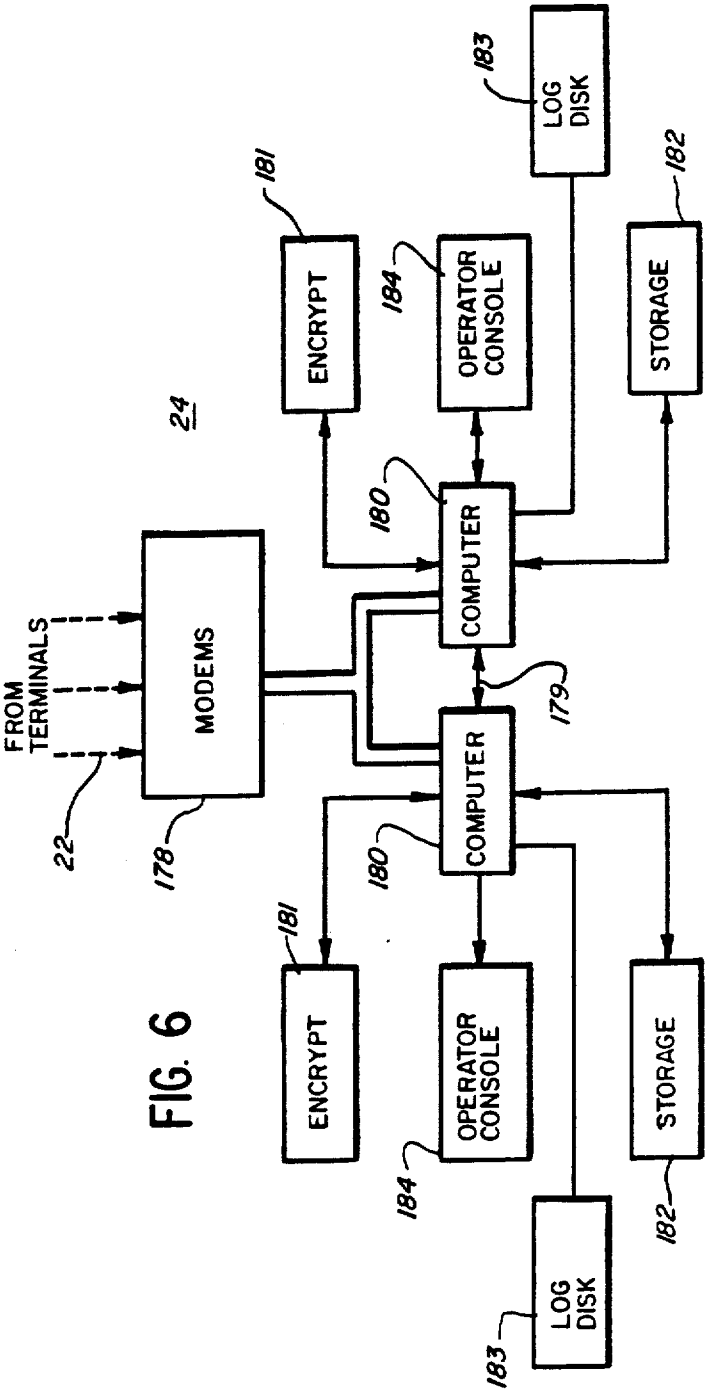
FIG. 6 is a detailed block diagram of the specific embodiment of the central controller shown in FIG. 1.

FIG. 6 is a detailed functional block diagram of a specific embodiment of a central controller 24 (see FIG. 1) according to the invention. The central controller 24 ties together and integrates all lottery system functions providing centralized control and data collection from remote terminals 20 through the terminal controllers 70. A polling procedure is utilized, whereby the telephone number of each terminal controller 70 is called in sequence, followed by transfer of data from the central controller 24 or a message from the central controller 24 requesting data. Requested data is then sent by the terminal controller 70 to the central controller 24 on the telephone line. The central controller 24 also keeps some phone lines available to receive unsolicited exception messages from the terminal controller 24. These messages can call the central controller to replenish exhausted resources in the terminal controller, to report exceptions, high tier winners and occurrences of the terminal controller operation by the agents. Optionally, encryption processors 181 may be coupled to the computers 180 for encrypting and decrypting transmissions.

The illustrated system is intended to provide high reliability and thus utilizes redundancy and conventional circuitry. It is understood that many other configurations would be possible.

The central controller 24 includes two fully parallel conventional computers 180, which in the preferred embodiment are Digital Equipment Corporation VAX computers, to perform lottery management, maintenance, and control functions. Two computers 180 are provided for enhanced reliability. However, one computer could alternatively be used. The parallel computers 180 communicate with each other through a high speed interprocessor link 179 which is a conventional computer communications network (e.g. Digital Equipment Corporation's DECNET), enabling them to share resources and constantly monitor each other's functions. At least one conventional hard disk storage device 182 (e.g. Fujitsu "Eagle" M2284 disk drive) is coupled to each of the parallel computers 180, as shown, for data and file storage. A separate disk storage device 183 is coupled to each computer 180 for logging purposes. In addition, operator control station 184 including a display terminal, teleprinter, and printer, are coupled to the computers 180 to permit operator control and monitoring.

As illustrated in FIG. 6, telephone signals are coupled from the lines 22 to a plurality of modems 178 which are coupled to the computers 180. Such modems are widely known in the art. In the preferred embodiment, each modem is a standard 300 baud, auto-dial, auto-answer modem.

Although both computers 180 operate simultaneously, when an output is required from the central controller, output from only one is sent to the remote terminal 20. Thus, only one of the computers is "active" for communication to the terminals but both computers 180 continuously duplicate all functions with only the active output used. The high speed link 179 between the computers 180 provides for the integrity of data going out and permits resolution of control to determine which computer will be active.

In normal operation, each computer 180 sends an "I'm alive-are you" signal to the other on a continuous basis. If the active computer fails, then after a predetermined period during which the inactive computer does not receive an answer, the inactive computer takes over and sends a failure message to the operator console. If the inactive computer fails, the active detects the failure and sends a failure message on the operator console. The central controller 24 then operates in a simplex mode wherein only one computer is operational.

A major function of the central controller 24 is collection of data from the terminal controllers 70. The central controller 24 maintains a list of phone numbers for each terminal controller 70 and dials these numbers according to a polling algorithm and schedule. The phone numbers, polling algorithm and schedule can be changed from the central controller 24 by the operator.

When either the central or terminal controller has initiated a phone connection with another receiving controller, it sends a connect request message with its password. The receiving controller then sends a connect acknowledge message with its password and waits for a transmission. The initiating controller may then transmit the appropriate data which must then be acknowledged by the receiving controller. If the receiving controller does not recognize the initiating controller's password, it sends back a connect reject message. The initiating controller may then re-initiate the call. This protocol establishes and authenticates a connection.

The data normally transmitted to the central controller in response to a poll is the game meter data. This includes number of games played, plays cancelled, low tier prizes, current position in mini-pool and free games played by repairmen.

Certain exception messages can also be transmitted to the central controller 24. These include coin-in jammed, ticket printer paper jammed, ticket printer out of paper, remote terminal housing 32 alarm, premises alarm, and power failure.

The terminal controller 70 can initiate a number of unsolicited messages to the central controller 24. These messages include cash box door openings, requests for new minipools, high tier winner requests and others.

All meter data, exception messages, and unsolicited messages are stored at the central controller 24. The central controller 24 maintains in its on-line data-base an on-going log of all messages received and maintains an on-line data base so that inquiries may be made regarding specific remote terminals 20.

The central controller 24 performs a number of major lottery management functions including lottery prize pool maintenance and lottery performance reporting. The central controller 24 controls the prize pools for each game. At the start of each mini-pool of 1000 plays for each game resident in each remote terminal, communications is established with the central controller. The remote terminal 20 first determines its portions of the seed numbers from independent changing events occurring in each remote terminal 20 (e.g. an internal clock value). The remote terminal 20 determined portions of the seeds are then encrypted and transmitted to the central controller 24. They are decrypted, combined with central controller 24 determined portions of the seed numbers, then re-encrypted, transmitted back to the remote terminal 20, decrypted, and stored in the sealed terminal controller 70. The terminal controller processor 150 then controls the distribution of the prizes based on the seeds. New prize pool data is sent to the terminal controller 70 whenever it has exhausted its mini-pool and requests a new mini-pool from the central controller. Thus, the central controller has control of lottery prize pool parameters.

Lottery performance reporting allows for on-line and off-line reports. On-line reports include full remote terminal activity reports, pool status reports, remote terminal availability reports and financial analysis of pool status for the overall lottery system. Off-line reports include, inter alia, prize liability reports, sales summaries, monthly remote terminal activity reports, weekly agent sales reports, and weekly remote terminal availability reports.

The central control of the lottery system permits a number of unique system capabilities. One such capability is an electronic market survey. The sophisticated centrally controlled lottery system can draw a random sampling of players who can be asked to participate in an electronic marketing survey. In the electronic marketing survey a free game play is offered on the remote terminal if the player will answer a few, simple market survey questions. Thus, on a random, or other basis, a predetermined number of plays in each mini-pool are selected as market survey free plays. The remote terminal displays on the video monitor the offer of a free game in exchange for answers to the market questions and allows the player to accept or reject the offer. Assuming the offer is accepted the basic questions, preferably yes-no questions, are displayed beginning with marital status, and sex, followed by questions about lottery use, level of education, age, location, etc. The player answers the questions using the player control devices 57. A speech recognition unit is particularly suitable for input of survey answers. This market survey could also be sold to others to permit market surveys relating to other than lottery markets. At the conclusion of the questions, a free game is provided.

The programs for the central controller operate within a multi-programming operating system. The operating system utilized in the preferred embodiment is Digital Equipment Corporation's VMS system. There are two categories of processes involving concurrently operating, interactive tasks, communication processes and file service processes. The communications processing includes all activities involving communications to and from the remote terminals. The file services tasks involve file handling interactively coupled to the communications program.

The communications program establishes communications with the terminal controller 70 for the purpose of polling, diagnostics, or dispatching commands. This occurs in response to an appropriate request from a file server program. The communications program also responds to the terminal controller requests for the purpose of providing prize validation, handling exceptions, handling mini-pool requests and handling door opening messages, and other terminal controller information. In addition, the communications program handles encryption and decryption either by utilizing an encryption/decryption subroutine or by utilizing encryption processors attached to the computers 180.

Thus, when a message is received the communication program processes the information, sending it to the appropriate file server program. Conversely, outgoing message data from the central controller 24 is coupled from a file server program to the communications program, which then handles the communication of the data to the appropriate remote terminal 20.

The file server programs are constantly running in the system, serving requests from the communications program and maintaining common files. The file server programs include the following programs:

A polling program controls remote terminal polling, polling to the terminal controller 70 to collect marketing and accounting data. The polls are conducted a predefined number of times a day in scheduled fashion, while twenty percent of them are selected randomly and polled at random times.

A marketing and accounting program handles marketing and accounting data which is sent to the central controller as a result of polls, or which is sent with unsolicited transmissions from the terminal controller 70 (e.g. with mini-pool requests, validations, exceptions, etc.).

A pool program handles creation of new pools and mini-pools on request from the terminal controller.

A validation program processes and stores all the exception messages as they arrive from the terminal controllers.

An operator program allows the central controller operator to access the system handling messages initiated by the operator.

A market survey program accepts and stores the market survey information from the terminal controller.

A hall of fame program receives information about big winners and creates a hall of fame data file. This hall of fame can subsequently by dispatched to the terminal controllers along with the poll requests. The remote terminal can then display the data.

A door checking program processes incoming messages from the terminal controllers carrying information about which remote terminal doors were opened or closed, and in what sequence. This program can create exception messages depending upon the sequence of door opening and closing. In addition, the program also processes information about the contents of the cashbox and handles agent invoice and accounting messages.

A logging program logs into a separate file all incoming and outgoing messages together with all other pertinent information.

Since the central controller 24 is comprised of two identical computers with identical files, each computer runs identical software. All incoming data is routed to both computers, but only one sends out its data. The systems are arbitrated by a watchdog program which runs continuously in each computer and interfaces with the watchdog program in the other computer to determine which computer is active. The results of each computer would also be compared to detect an error condition. The program monitors its own environment by analyzing error messages and by a periodic handshake with the other watchdog program. If it detects that the other system is not in operation, it instructs the communications program to switch to active if it is not already active.

A specific embodiment of the video amusement gaming system with pool prize structure has been described for purposes of illustrating the manner in which the invention may be made and used. It should be understood that implementation of other variations and modifications of the invention in its various aspects will be apparent to those skilled in the art, and that the invention is not limited thereto by the specific embodiment described. It is therefore contemplated to cover by the present invention any and all modifications, variations, or equivalents that fall within the true spirit and scope of the basic underlying principles disclosed and claimed herein.

What is claimed is:

1. In a gaming system having a central controller and a plurality of remote terminals each operable for playing a game, a prize distribution system guaranteeing a predetermined number of winners at each terminal comprising:

means included in said central controller for assigning a minipool to each terminal, each of said mini-pools representing a fixed number of game plays and a predetermined number of prizes; and means included in each of said terminals for randomly distributing prizes among different plays of the terminal's minipool.

2. The gaming system of claim 1 wherein said central controller includes means for generating a random seed for each of said minipools and said prize distributing means of each of said terminals includes means responsive to the random seed generated for its associated minipool for implementing a randomizing algorithm to randomly distribute the prizes.

3. The gaming system of claim 2 wherein said central controller includes means for implementing the randomizing algorithm of each terminal based on the random seed generated for the terminal's minipool to validate winners at the terminal.

4. The gaming system of claim 2 wherein each of said terminals includes means for transmitting a variable value to said central controller, said random seed generating means being responsive to a variable value transmitted from a terminal to generate the random seed for said terminal from said variable value.

5. The gaming system of claim 1 wherein said central controller further includes:

means for assigning each play of each of said minipools to a main pool; and means for randomly distributing a predetermined number of additional prizes among the minipools of said main pool.

6. The gaming system of claim 5 wherein each of said terminal's prize distribution means randomly distributes any main pool prize distributed to its minipool with its mini-pool prizes.

* * * * *